(12) United States Patent
Schröder

(10) Patent No.: US 6,390,060 B1
(45) Date of Patent: May 21, 2002

(54) THROTTLE VALVE FOR AN INTERNAL COMBUSTION ENGINE

(75) Inventor: Thomas Schröder, Berlin (DE)

(73) Assignee: Pierburg AG, Neuss (DE)

( * ) Notice: Subject to any disclaimer, the term of this patent is extended or adjusted under 35 U.S.C. 154(b) by 41 days.

(21) Appl. No.: 09/596,093

(22) Filed: Jun. 16, 2000

(30) Foreign Application Priority Data

Jun. 22, 1999 (DE) .......................................... 199 28 473

(51) Int. Cl.$^7$ ................................................ F02D 9/16
(52) U.S. Cl. ........................................ 123/337; 251/305
(58) Field of Search .......................... 123/337; 251/305, 251/306

(56) References Cited

U.S. PATENT DOCUMENTS

| 5,315,975 A | * | 5/1994 | Hattori et al. | ............... | 123/337 |
| 5,374,031 A | | 12/1994 | Semence et al. | ............. | 251/305 |
| 5,992,377 A | * | 11/1999 | Dall'Osso et al. | .......... | 123/337 |
| 6,006,722 A | * | 12/1999 | Hall | ............................ | 123/337 |

FOREIGN PATENT DOCUMENTS

| DE | 442995 | 2/1996 | |
| DE | 19500344 | 7/1996 | |
| EP | 0624228 | 11/1994 | |
| FR | 2663710 | 12/1991 | |
| FR | 2729729 | 7/1996 | |
| JP | 19009 A | * 2/1979 | ................. 123/337 |

* cited by examiner

*Primary Examiner*—Willis R. Wolfe
(74) *Attorney, Agent, or Firm*—Ladas & Parry

(57) ABSTRACT

A throttle valve for controlling air flow to an internal combustion engine in which a throttle valve body is mounted in an intake channel to control air flow through the intake channel to the internal combustion engine. A spindle is rotatably supported crosswise in the intake channel and the throttle body is secured to the spindle for rotation therewith between closed and open positions. The intake channel has a wall with an inside surface of elliptical cross-sectional shape, the throttle body being formed as a planar disk having a circular periphery. The throttle body in the closed position is inclined with respect to the inside surface of the wall and the opposite edges of the valve body are in peripheral contact with the inside surface.

9 Claims, 2 Drawing Sheets

THROTTLE VALVE FOR AN INTERNAL COMBUSTION ENGINE

FIELD OF THE INVENTION

The invention relates to the construction of a throttle valve for an internal combustion engine.

BACKGROUND AND PRIOR ART

A throttle valve is disclosed in EP 624 228 B1 in which a throttle valve body is supported in a metering venturi passage in an intake channel for precisely controlling air flow in the intake channel, particularly at small opening angles of the throttle valve. The throttle valve body is not cylindrical but has an elliptical outer contour, such that the circumferential surface of the throttle valve body almost seals the intake channel when in a closed position at an inclination angle of about 3–15°.

Positioning of such an elliptical or oval throttle valve body so that its opposite elliptical edges engage the inside surface of the cylindrical intake channel in the closed position must be performed by hand, in order to achieve a uniform and minimum circumferential gap for passage of leakage air. Even a slight angular deviation of the throttle valve body from the optimal position leads to an undesired increase of the air flow. This is especially the case at idling, since the necessary lifting of the valve body in the opening direction must be relatively large, in order to prevent jamming and sticking of the valve body. Manual adjustment is time consuming and expensive, and makes automatic assembly of the throttle valve impossible.

SUMMARY OF THE INVENTION

An object of the invention is to provide a throttle valve which does not suffer from the above disadvantages.

The above and further objects are achieved by symmetrically securing the throttle body on a spindle rotatably supported crosswise in the intake channel and forming the valve body with an outer circular contour and an inside surface of the wall of the intake channel with an elliptical shape. The throttle valve body thus is a planar disk and in the closed position is inclined with respect to the inside surface of the wall of the intake channel and has opposite edges in peripheral contact with the inside surface.

Because the throttle valve body is cylindrical with a circular periphery and it is planar and because the inside surface of the intake channel has an elliptical contour in the closing region of the valve body, the throttle valve body comes into precise contact with the inside surface of the intake channel and it is possible to secure the throttle valve body to the spindle by an automatic manufacturing process. Adjustment of the throttle valves in a particular direction of rotation is no longer necessary.

DETAILED DESCRIPTION

Figure 1:
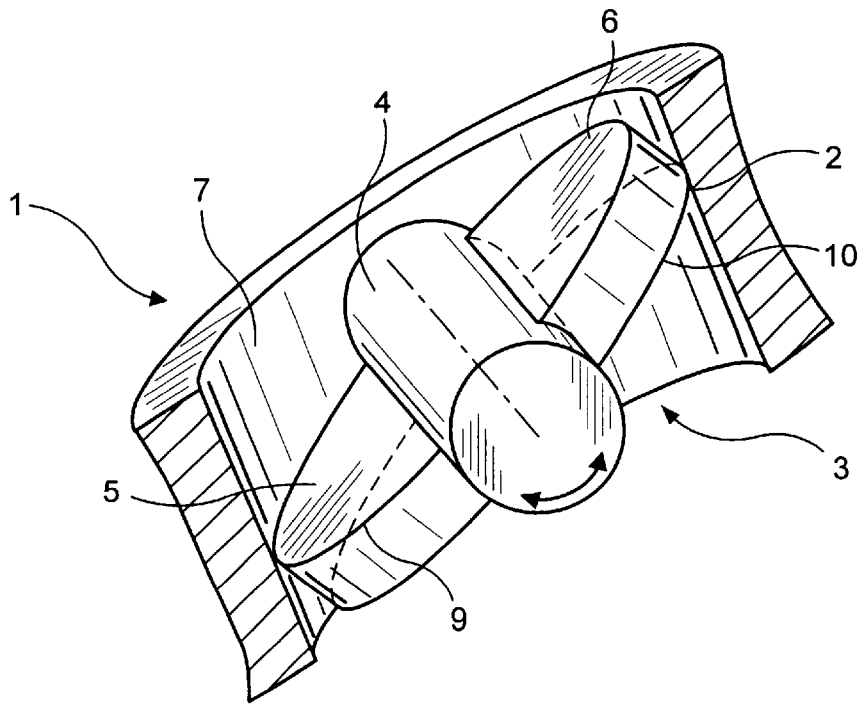
FIG. 1 is a perspective view of a first embodiment of a throttle valve according to the invention.
Figure 2:
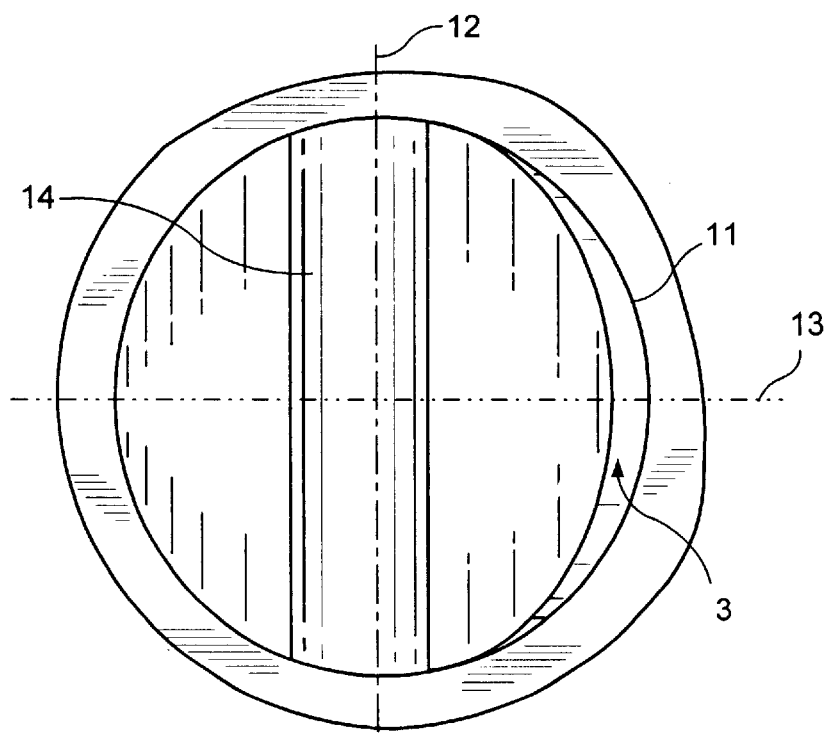
FIG. 2 is a top view of the throttle valve in FIG. 1.
Figure 3:
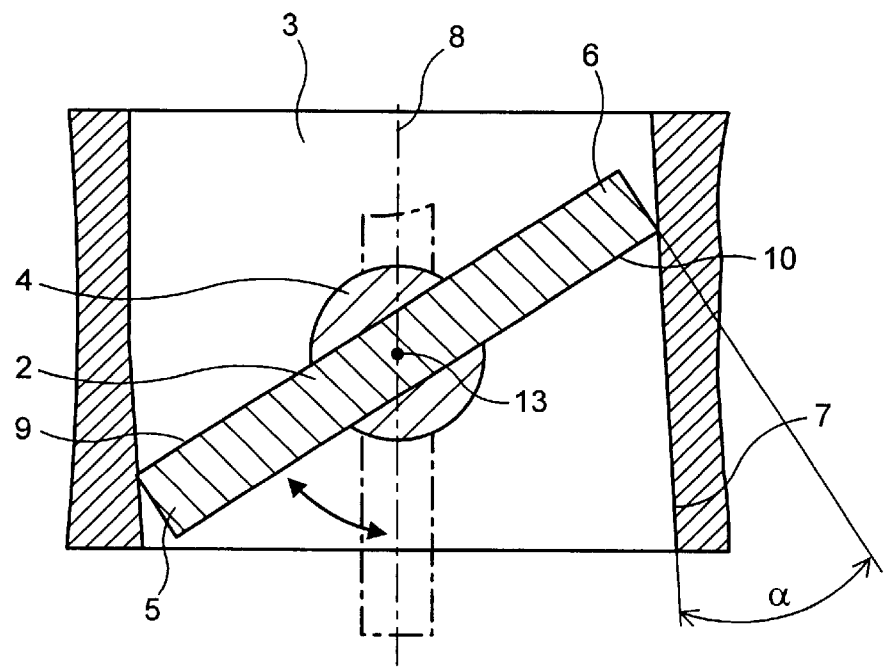
FIG. 3 is a sectional view of the throttle valve in FIG. 1.

FIG. 1 shows a throttle valve 1 having a valve body 2 which is secured to a spindle 4 mounted for rotation crosswise in an intake channel 3 through which air can be supplied to an internal combustion engine (not shown). The throttle body 2 is symmetrically secured to the spindle 4 to define two equal half portions 5 and 6 on opposite sides of the spindle 4. The throttle valve body is rotatable with the spindle between a closed position as illustrated in FIG. 3 and an open position for controlling air flow to the engine. The intake channel 3 has a wall with an inside surface 7 which is contacted by the valve body in the closed position. The surface 7 has an elliptical shape as seen in FIG. 2. The valve body 2 is formed as a flat, planar disk with an outer cylindrical periphery providing a circular contour. In the closed position of the valve, the opposite half portions 5, 6 of the valve body have respective opposite surfaces 9 and 10 which contact the inside surface 7 of the wall of the intake channel.

The contact of the peripheral edges of the half portions of the valve body takes place as shown in FIG. 3 when the valve body is closed at an inclination angle α relative to the central axis 8 of the intake channel. The central axis 8 of the intake channel is coincident with a central axis of the elliptical surface 7 as shown in FIG. 2.

The arrangement of the cylindrical valve body 2 and the elliptical inside surface of the intake channel provides a minimized leakage air gap between the contact surfaces in the closed position of the valve in contrast to conventional throttle valves. Moreover, because of the circular and planar configuration of the throttle valve body 2, the manufacture and assembly of the throttle valve 1 is substantially simplified and is capable of being conducted automatically. Furthermore, since the throttle valve body 2 is made as a planar cylindrical disk at the minimum angle α when the valve is closed, the contact of the respective edges 9 and 10 of the valve body with the inside surface 7 of the intake channel is free of sticking and jamming. This contact position can serve as the idling position thus eliminating the need to slightly open the valve as in the construction known in the art.

Referring to FIG. 2 which shows the intake channel 3 with the throttle valve body 2 disposed therein, it is seen that the inside surface of the wall of the intake channel 3 defines a contact region 11 of elliptical shape having a major axis 12 and a minor axis 13. The major axis 12 is parallel to the axis of rotation of the spindle 4.

Referring to FIG. 3 which shows a sectional view of the throttle valve, therein it is seen that the throttle valve body 2 is inclined in the closed position at the angle α relative to the axis 8 of intake channel 3. The angle α is a function of the ratio of the major and minor axes. The angle α and thus the inclination of the throttle valve body 2 relative to the inside surface 7 is proportional to the ratio of the major axis 12 to the minor axis 13 of the ellipse 11. Also visible in FIG. 3, is the contact of respective edges 9 and 10 with surface 7 in the closed position of the valve. The axis 8 of the intake channel is coincident with the axis of the elliptical inside surface 7 and it intersects the rotational axis 13 of throttle valve body 2. In the embodiment of FIG. 3, the throttle valve is installed in a substantially vertical position in which the central axis 8 is substantially vertical and the valve body 2 is inclined at angle α with respect to the vertical.

Figure 4:
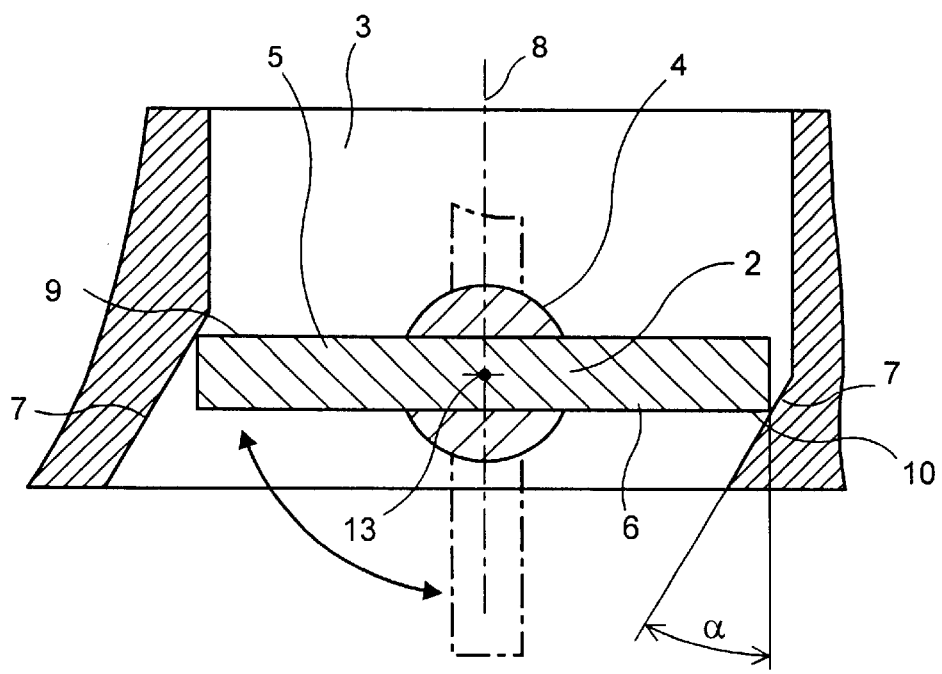
FIG. 4 is a sectional view of a second embodiment of the throttle valve according to the invention.

FIG. 4 shows a second embodiment of the throttle valve according to the invention and herein the same reference numerals will be used to identify corresponding elements of the valve. In FIG. 4, the inside surface 7 of the wall of the intake channel is inclined at angle α relative to the vertical and in the closed position of the valve, the valve body 4 is substantially horizontal. In this embodiment, the central axis of the elliptical wall surface 7 is inclined at angle α relative to the central axis 8 of the intake channel.

The machining of the intake channel in both embodiments can be achieved in conventional manner by rotary machining or milling.

In certain applications, it may be desirable to minimize the leakage air flow even further in the idling position or in a near idling position i.e. in closed or nearly closed position of the throttle valve. For this purpose, the contact face of the inside wall surface 7 can be plastically deformed by the edges 9, 10 of the throttle valve half portions 5, 6 of the throttle body 2 by forcible over-rotation of the valve body 2 in the closed position. In this way, valve body 2 can be made to "dig in" to the surface 7 by over-rotating the spindle 4 at high torque in the closing direction of the valve. Mechanical pressure elements which act directly in the intake channel on the throttle valve body 2, could also be used. In order to assist or initiate the plastic deformation of the surface 7 vibrations and selective heat application can be employed. An idling stop position of the throttle valve which will be free of jamming of sticking is then achieved by slight opening of the valve body through an angle of about 0.2°. Advantageously, minimization of the air flow in a near idling position is possible by use of an adjoining conventional suction zone.

Although the invention has been described in conjunction specific embodiments thereof, it will become apparent to those skilled in the art that numerous modifications and variations can be made without departing from the scope and spirit of the invention.

What is claimed is:

1. A throttle valve for controlling air flow to an internal combustion engine comprising:

an intake channel for air flow to an internal combustion engine, a throttle body mounted in said intake channel to control the air flow, a spindle rotatably supported crosswise in said intake channel, said throttle body being secured to said spindle for rotation therewith between closed and open positions, said intake channel having a wall with an inside surface of elliptical shape, said throttle body being a planar disk having a circular contour, said throttle body in said closed position being inclined with respect to said inside surface of said wall of said intake channel and having opposite edges in peripheral contact with said inside surface to define said closed position.

2. A throttle valve as claimed in claim 1, wherein said spindle is centrally secured to said valve body to form equal halves of said valve body on opposite sides of said spindle.

3. A throttle valve as claimed in claim 2, wherein said inside surface of said wall of elliptical shape has major and minor axes, having a ratio related to an angle of inclination of said valve body in said closed position.

4. A throttle valve as claimed in claim 3, wherein said inside surface of said wall of elliptical shape has a central axis, said spindle having an axis of rotation which intersects said central axis.

5. A throttle valve as claimed in claim 4, wherein said intake channel has a central axis, said central axis of said elliptical portion being coincident with said central axis of said cylindrical axis.

6. A throttle valve as claimed in claim 5, wherein said central axis of said intake channel is substantially vertical in an installed position of the throttle valve and said valve body is inclined with respect to the horizontal in the closed position of the valve.

7. A throttle valve as claimed in claim 5, wherein said intake channel has a central axis, said central axis of said elliptical portion being inclined with respect to the central axis of said intake channel.

8. A throttle valve as claimed in claim 7, wherein said central axis of the intake channel is substantially vertical in an installed position of the throttle valve and said valve body is substantially horizontal in the closed position of the valve.

9. A throttle valve for controlling air flow to an internal combustion engine comprising:

an intake channel for air flow to an internal combustion engine, a throttle body mounted in said intake channel to control the air flow, a spindle rotatably supported crosswise in said intake channel, said throttle body being secured to said spindle for rotation therewith between closed and open positions, said intake channel having a wall with an inside surface of elliptical shape, said throttle body being a planar disk having a circular contour, said throttle body in said closed position being inclined with respect to said inside surface of said wall of said intake channel and having opposite edges in peripheral contact with said inside surface, wherein said inside surface of said wall is plastically deformed by the peripheral edges of the valve body by over-rotation of said valve body to provide a defined clearance gap for the valve body in an idling position.

* * * * *